June 3, 1941.  A. I. DUNN  2,243,946
MEANS AND METHOD FOR MACHINING PARTS
Filed Aug. 25, 1938  3 Sheets-Sheet 1
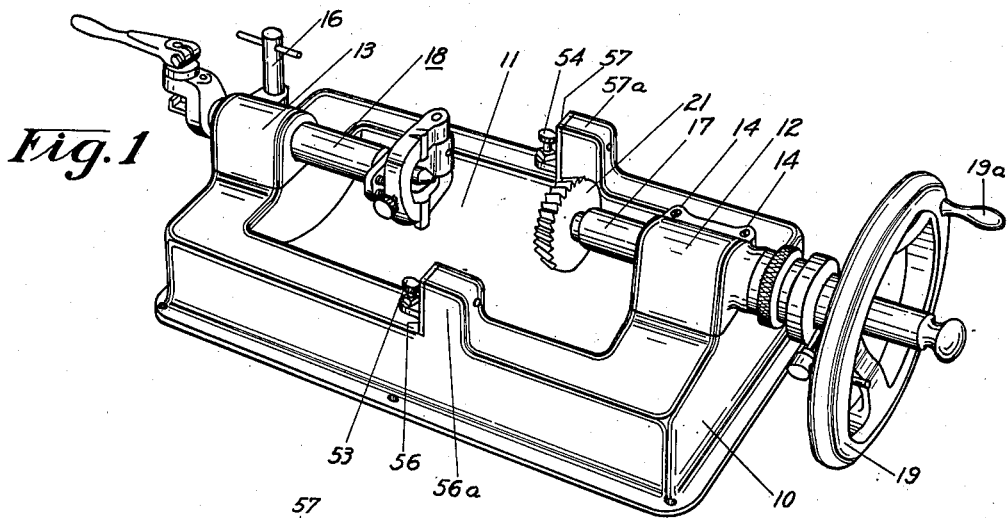
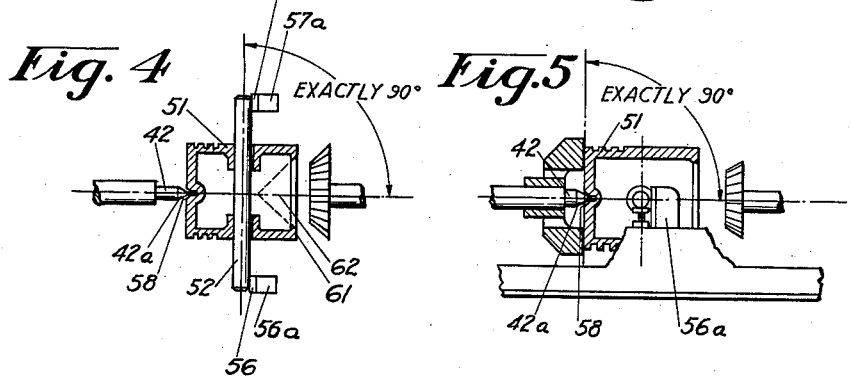
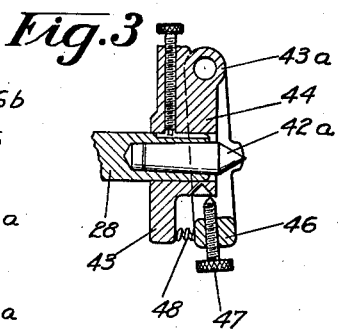
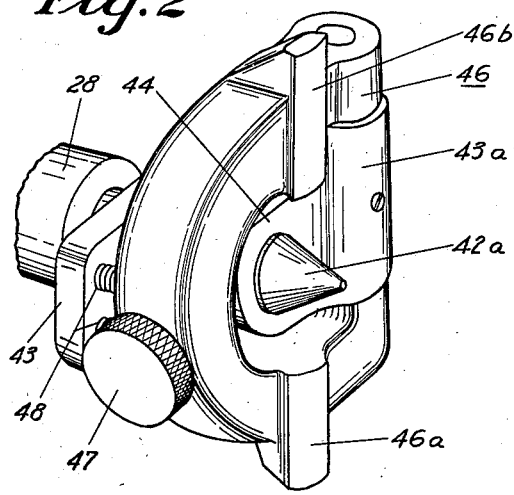
INVENTOR.
ALLEN I. DUNN
BY Flournoy Corey
ATTORNEY.

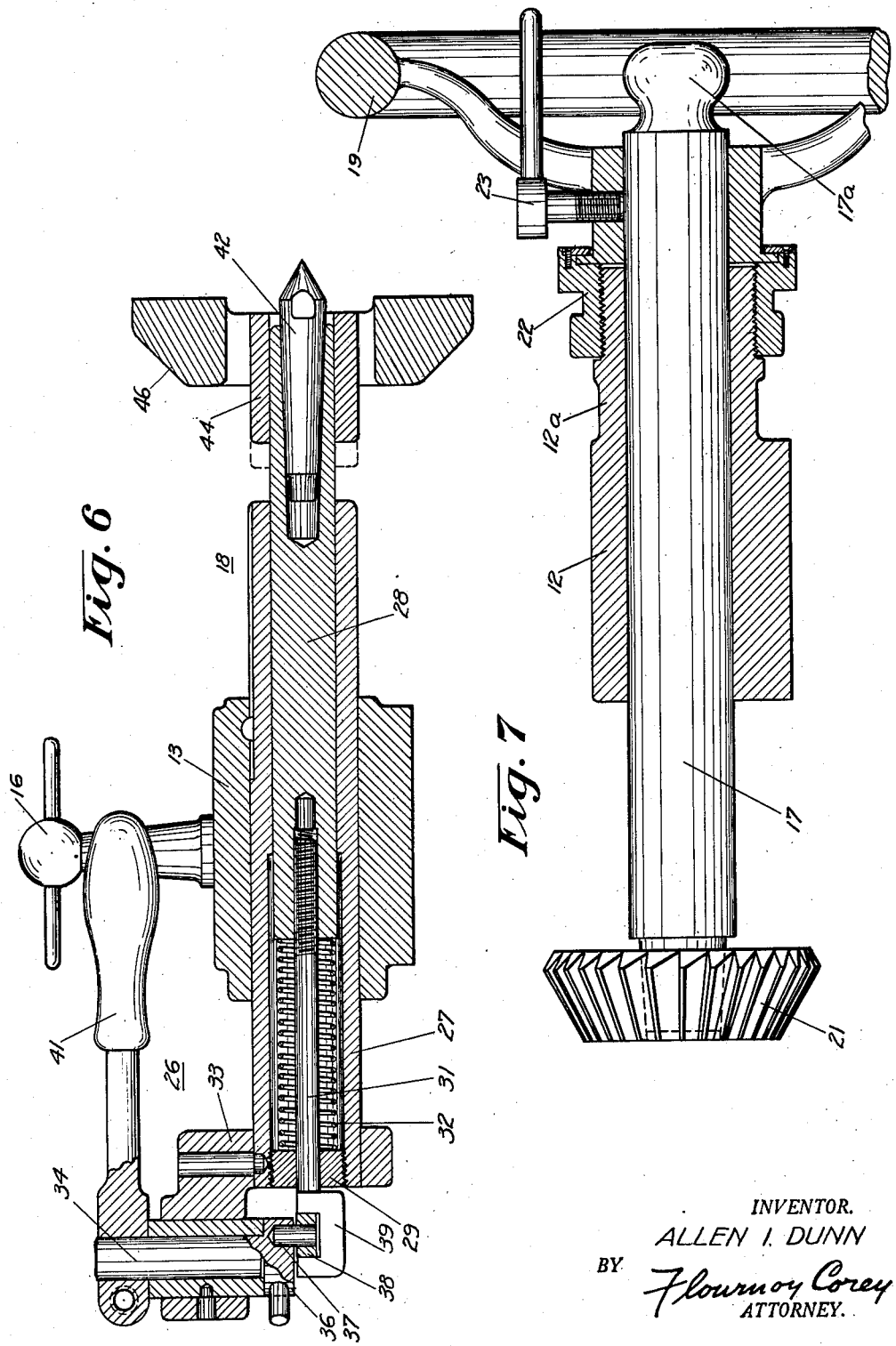

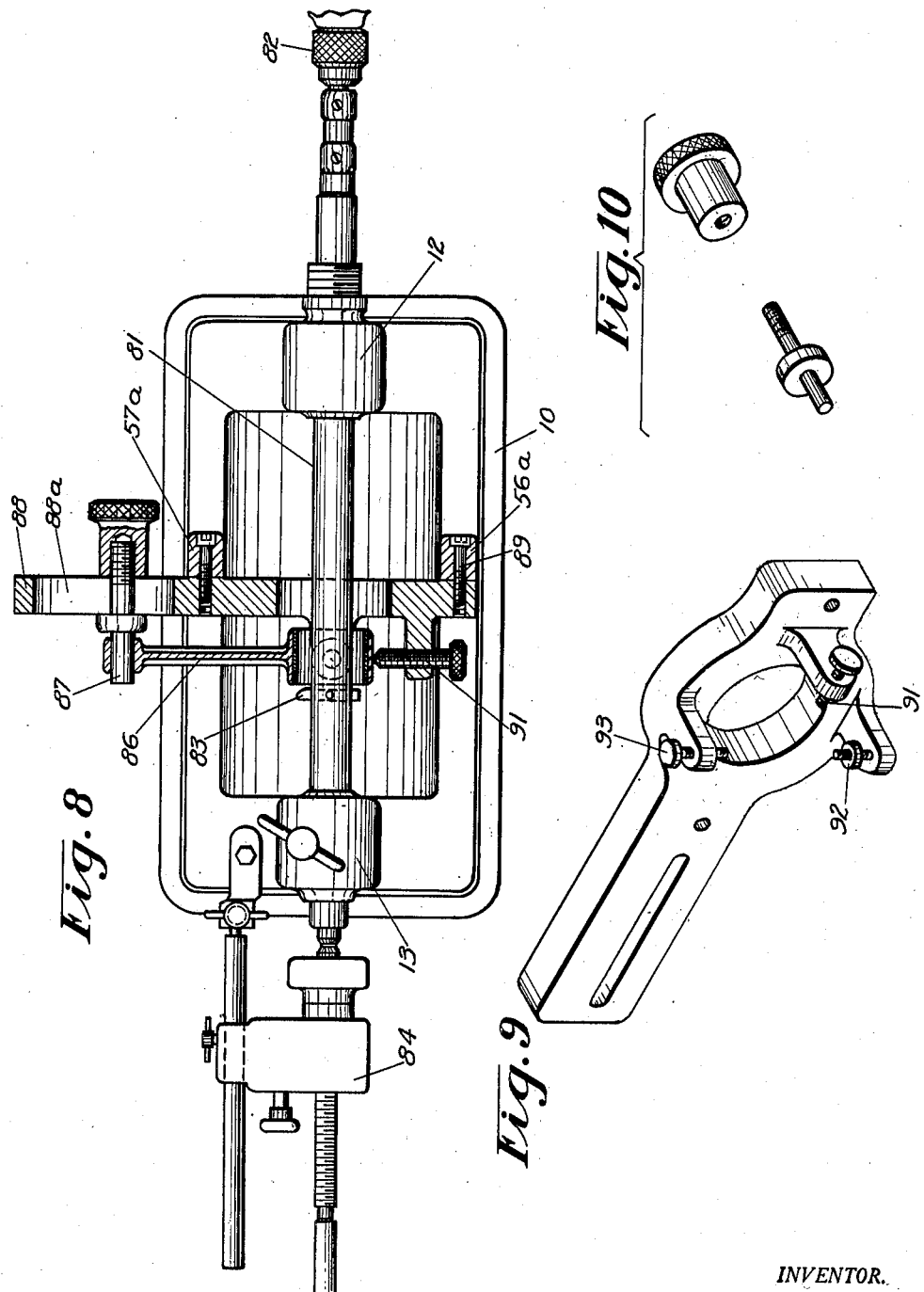

Patented June 3, 1941

2,243,946

UNITED STATES PATENT OFFICE 2,243,946

MEANS AND METHOD FOR MACHINING PARTS

Allen I. Dunn, Cedar Rapids, Iowa, assignor to Cedar Rapids Engineering Company, Cedar Rapids, Iowa, a corporation of Iowa Application August 25, 1938, Serial No. 226,722

11 Claims. (Cl. 77—63)

This invention relates to means for and a method of squaring and machining parts and has particular relation to a means for cutting and chamfering the skirts of pistons, the openings of connecting rods, and like operations.

It has become common practice in internal combustion repair work, when fitting new pistons to a motor, to purchase slightly oversize semi-finished pistons and then grind the cylinder contacting walls of the pistons to the exact size to form the desired fit within the motor cylinders. It is, of course, extremely desirable that the piston pin holes of these pistons be exactly parallel to the crank shaft of the motor, otherwise undue wear of the motor parts will occur.

In grinding the walls of the piston to size, it is the usual practice to employ two centers. One center is that provided by wedging the lower inner edge of the skirt of the piston on a tapered mandrel, and the other center is the center hole provided in the upper face of the piston. In order to provide the center for the mandrel, it is the usual practice to chamfer the inner face of the lower edge of the piston by pressing a rotating cutting tool against this edge without providing any particular guiding means for the cutter.

The manufacturers of semi-finished pistons try to have the piston pin hole exactly at right angles to the axis of the piston formed by the center hole in the head and the edge of the skirt, but it is a known fact that, because of warping or inaccurate workmanship, the piston pin holes are not always square with reference to this center line. As a result of the usual method of chamfering the skirt of an out-of-square piston, the piston pin hole will not be at right angles to the wall of the piston after grinding. The effects of this error cannot be corrected. The usual practice is to bend the connecting rod to accommodate the rod to the misalignment of the pin and crank shaft, but obviously this does not correct the misalignment, and undue wear will occur.

If, however, a line of centers is provided in the piston which line is at right angles to the axis of the piston pin hole the outer wall of the piston will be square with the piston pin hole.

It is, therefore, among the objects of my invention to establish a line of centers in a piston by which the piston may be supported while it is being ground and to provide means to so establish this line of centers that when the piston has been ground the cylinder contacting surface or wall of the piston will be square with the piston pin hole.

Another object of my invention to provide a method of and means for machining centers for pistons and the like which will be exactly at right angles with the piston pin hole, whereby the machined and ground faces of the piston will be square with the piston pin hole after the piston has been machined.

Still another object of my invention is to provide accurate methods and means for machining a part in relation to certain base lines of the part.

It is another object of my invention to provide means for drilling holes which will be at exact right angles to certain reference lines of the part being drilled.

Another object of my invention is to provide a new and novel means for aligning a cylindrical member.

Other features and objects of the invention will be more apparent to those skilled in the art upon a consideration of the accompanying drawings and following specifications, wherein is disclosed several exemplary embodiments of the invention, with the understanding, however, that such changes may be made therein as fall within the scope of the appended claims, without departing from the spirit of the invention.

In said drawings:

Figure 1 is a view in perspective of a preferred embodiment of my invention.

Figure 2 is a fragmentary view in perspective of an aligning means for aligning pistons and the like.

Figure 3 is a view in section of the device shown in Figure 2.

Figure 4 is a diagrammatic illustration of how the aligning means operates to align a piston or the like.

Figure 5 is a diagrammatic view illustrating the means for aligning the piston about a vertical axis.

Figure 6 is a view partly in section and partly in elevation of the tailstock of the device shown in Figure 1.

Figure 7 is a view partly in section and partly in elevation of the headstock of the device shown in Figure 1.

Figure 8 is a plan view of the device as it is used for boring the big ends of a connecting rod or the like.

Figure 9 is a view in perspective of a jig for holding the connecting rod in position during the boring operation, and Figure 10 is a view in perspective of the pin on which the connecting rod of Figure 8 is located.

The machine with which I am now concerned is particularly suitable for chamfering the lower inner edges of pistons to provide a line of centers for machining the piston so that the machined surfaces are square with the piston pin opening. It may also be utilized to drill or machine openings such as the big ends of connecting rods and like purposes, but obviously the machine and the method of machining may be applied to many other uses.

The line of centers preferably used includes the center hole in the top or head of the piston and the apex of a conical cut (Figure 4) made by a conical cutter in chamfering the inner lower edge of a piston. If this line of centers is at right angles to the piston pin hole the ground wall of the piston will be true or square with the piston pin. My invention lies in providing a piston holding means and a chamfering means by which the skirts of the piston may be chamfered so that the apex of a conical chamfering cut will be on a center line passing through a given reference point, such as the center hole in the head, which center line will be at right angles to the piston pin hole.

Referring now to the drawings:

A preferred embodiment of my invention includes the substantially rectangular base 10 having a closed bottom 11 and pedestals 12 and 13 at the opposite ends thereof. The pedestal 12 is provided with means such as the screw 14 for taking up the play between the shaft 17 and the pedestal. The pedestal 13 is provided with a T-handle nut for clamping the tailstock 18 in the pedestal as desired. The shaft 17, which may be termed the headstock shaft, is adapted to rotate in the pedestal 12 and is rotated by means of the hand wheel 19. The shaft 17 carries the rotary cutter 21.

The shaft 17 is provided with a feeding mechanism illustrated more particularly in Figure 7 and including a thumb nut 22 which is threaded on a projecting portion 12a of the pedestal 12. The hand wheel 19 may be locked to the shaft 17 by means of the locking screw 23. The knob 17a on the end of the shaft 17 permits drawing or pushing the shaft 17 through the hand wheel to accommodate the cutter to various lengths of pistons. The cutter 21 is, of course, removable from the shaft 17 to permit the use of different sizes of cutter for the various diameters of pistons. In using the cutter the cutter is revolved by means of handle 19a of hand wheel 19, and the feed screw 22 gradually tightened to move the cutter against the work.

The tailstock shaft 18 is slidable in the pedestal 13 and may be locked in place by means of the tailstock locking means 16. The tailstock moving or operating device, illustrated generally at 26, is mounted on a sleeve 27 which forms the outer shell of the tailstock 18. This sleeve 27 is slidable in the tailstock pedestal 13 and the tailstock shaft 28 is slidable in the sleeve. The left end of the sleeve 27 is closed by means of a plug 29. An adjustment rod 31 passes through the plug and is threaded into the left end of the shaft 28. A spring 32 biases the shaft 28 to the right with respect to the sleeve 27.

The tailstock adjusting means is secured on the sleeve 27 by means of a bracket 33 and an adjusting shaft 34 is rotatably mounted in the bracket. This shaft has a collar 36 at the lower end thereof and the collar is adapted to receive a pin 37. The pin 37 is eccentric with respect to the axis of the shaft 34. The pin 37 is mounted in a slide 38 so that it can move transversely to the tailstock, and this slide is received in a guide 39 which is mounted on the projecting end of the adjusting rod 31. It is apparent that rotation of the shaft 34 by means of the handle 41 results in reciprocatory motion of the guide 39, and thus of the tailstock shaft or spindle 28.

The tailstock shaft is chamfered to receive a removable center 42 at the right or work engaging end thereof. A plate 43 (Figures 2 and 3) is integral with a sleeve or hub 44 adapted to fit over the exposed end of the tailstock spindle 28. This plate is removably engaged with the end of the shaft 28 and is provided with a knuckle at 43a for receiving the pivot shaft of a vertical centering device illustrated generally at 46. This centering device is in the form of a yoke and is provided with work engaging faces or shoulders 46a and 46b, which are disposed above and below the point 42a of the center 42. The thumb screw 47 is threaded through the yoke and is provided with a point for engaging the sleeve 44 of plate 43. Springs 48 are provided for biasing the vertical centering member 46 outwardly against the piston.

In operating the device the piston 51 (Figures 4 and 5) is loosely received on a centering rod or arbor 52. This arbor is supported on the frame 10 by means of supports 53 and 54. The hardened steel blocks 56 and 57 are ground to such a thickness that the exposed faces of the blocks are exactly on a line at right angles to the center line of the shaft 17, and of course the center line of the shaft 17 is identical with the center line of the tailstock 18. The supports 53 and 54 are so located that the arbor 52 is exactly at right angles with and preferably passes through the axis of the shaft 17. Now it is apparent that if the piston 51 is pushed tightly against the arbor 52 by means of pressure applied exactly on the center line of shaft 18, the piston pin hole will be at exactly right angles with the axis of shafts 17 and 18. This pressure on the center line of shaft 18 is supplied by the spring 32.

In using the piston squaring device, the operator withdraws the tailstock shaft 28 in the sleeve 27, that is, moves it to the left against the pressure of spring 32, by moving the handle 41 to the left. He then moves the sleeve 27 to the right and locks the sleeve in the pedestal 13 by means of the locking means 16. He then moves the handle 41 from left to right, which permits the point 42a of the center 42 to bear against the piston head center hole 58. In this way, exact horizontal alignment of the piston with reference to the shaft 17 is secured.

Now in order to secure exact vertical alignment of the piston with regard to the center line of shaft 17, the locking screw 47 is loosened and the yoke 46 is permitted to bear against the head of the piston, as illustrated in Figures 3 and 5, with the biasing action of the springs 48 against plate 43 supplying the pressure. It is apparent now that if the faces 46a and 46b of the yoke 46 are in exact vertical alignment at right angles with the center line of shaft 17, the head of the piston will be in exact vertical alignment at 90 degrees with respect to the center line of shaft 17.

The cutter 21, when used to chamfer the inner lower edge 61 of the piston 51, will cut a chamfer on this edge which is exactly at right angles to the center line 62 passing through the shaft 17.

In this manner two centering points are now established, namely, the center hole point 58 and the point 61, the line passing through which is exactly at right angles to the piston pin hole. Inasmuch as the centering hole 58 is on the central axis of the piston 51, thus established, when the piston is placed in a lathe or grinder for machining or grinding, the exposed cylindrical wall of the piston will be ground exactly at right angles to the center line of the piston pin hole.

The device here shown may readily be used for boring or drilling the big ends of connecting rods and for like purposes. When the device is used for this purpose, a boring bar 81 is rotatably mounted in pedestals 12 and 13 and this boring bar is driven by means of an electric drill or the like, illustrated at 82. The boring bar carries a cutter 83, and a conventional automatic feed mechanism, illustrated generally at 84, may be used for feeding the boring bar through the work. The little end of the connecting rod 86 (see Figures 8, 9 and 10) is received on a pin 87 and the pin 87 is supported in a slot 88a of jig plate 88. This jig plate is secured to the block supports 56a and 57a preferably by means of cap screws 89. The thumb screws 91, 92 and 93 are used to secure correct alignment of the big end of the connecting rod.

It is apparent now that the blocks 56a and 57a will hold the jig 88 in exact alignment at right angles to the center line of the boring bar 81, and that the opening through the big end of the connecting rod, which is cut by the cutter 83, will be exactly parallel to the opening through the little end of the connecting rod.

Although I have described specific embodiments of my invention, it is apparent that modifications thereof may be made by those skilled in the art. Such modifications may be made without departing from the spirit and scope of my invention as set forth in the appended claims.

I claim as my invention:

1. In a piston squaring tool, a rotary cutting means, a piston supporting means passing through the piston pin opening, means for supporting the supporting means on a center line exactly at right angles to the center line of rotation of the cutting means, and means for biasing the piston against the supporting means whereby a line passing through the cutting means and through the center in the head of the piston is exactly at right angles with reference to the piston supporting means.

2. A piston squaring device including a rotating cutting means and means for squaring the piston with the cutting means including a line contact means adapted to be located in the piston pin hole, means for holding the line contact means at right angles with the axis of rotation of the cutting means, means disposed in the axial line of the cutting means and bearing against the head of the piston for biasing the piston pin hole against the line contact means, and means for squaring the plane of the surface of the piston to place it at right angles to a plane parallel to the axis of rotation of the cutting means and passing through the axis of the line contacting means.

3. A piston squaring device including a rotatable cutting means, means for aligning the piston pin hole at right angles with the axis of the cutting means comprising an arbor received in the piston pin hole, and means for biasing the piston in a horizontal plane so that the piston pin hole bears against the arbor to hold the piston pin hole exactly at right angles to the cutting means.

4. A piston squaring device including a rotating cutting means, means for aligning the piston pin hole at right angles with the axis of the cutting means comprising an arbor received in the piston pin hole, means for biasing the piston in a horizontal plane so that the piston pin hole bears against the arbor to hold the piston pin hole exactly at right angles to the cutting means, and additional means bearing against the piston in a vertical plane for aligning the piston vertically exactly at right angles to the cutting means.

5. In a piston squaring machine, a rotating cutter, an arbor for supporting the piston, means for supporting the arbor at right angles to the axis of rotation of the cutting means, and means for biasing the piston horizontally and vertically against the arbor so that the center hole of the piston is in the axis of rotation of the cutting means and the axis of the piston pin hole is at right angles with the axis of rotation of the cutting means.

6. In a piston squaring means, a rotating cutter, and means for supporting the piston so that the center hole of the piston is aligned with the axis of rotation of the cutter and the piston pin hole is at right angles to the axis of rotation of the cutter, said means including an arbor and means for biasing the piston against the arbor.

7. In a piston squaring means, a support means for the piston including an arbor passing through the piston pin hole, means bearing against the center of the head for holding the piston at right angles to the cutter, and additional means for holding the piston at right angles vertically to the axis of the cutter comprising a pair of spring actuated shoulders disposed in vertical position with respect to one another.

8. In a piston squaring device, a biasing means including a spring actuated center, and a pair of shoulders pivotally supported and spring biased and adapted to bear against the head of the piston.

9. In a piston squaring device, a base, a headstock including a shaft and cutter rotated by the shaft, a tailstock including a tailstock shaft, a spring pressed center in the tailstock shaft, and a plate pivotally connected on the tailstock shaft and having shoulders for bearing against the work to bias the work toward the cutter.

10. Means for establishing a line of centers in a piston on which the piston may be ground comprising a conical cutter, means for supporting the piston with the piston pin hole at right angles to the axis of rotation of the cutter comprising an arbor at right angles to the axis of rotation of the cutter in the piston pin hole, and means for biasing the piston against the arbor so that the piston pin hole is at right angles with respect to the axis of rotation of the cutter.

11. In a piston squaring device, a movable dead center adapted to be engaged in the top grinding center of a piston, a rotatable cutter in axial alignment with the dead center, means comprising an arbor disposed at right angles to the axis of the cutter and substantially in the same plane therewith, said arbor adapted to be received in the wrist pin openings of the piston, and means for squaring the upper surface of the piston at right angles to a plane parallel to the axis of the cutter and passing through the arbor.

ALLEN I. DUNN.